US011132168B2

(12) United States Patent
Yamada

(10) Patent No.: US 11,132,168 B2
(45) Date of Patent: Sep. 28, 2021

(54) DISPLAY METHOD, DISPLAY DEVICE, AND DISPLAY PROGRAM

(71) Applicant: Seiko Epson Corporation, Tokyo (JP)

(72) Inventor: Yusuke Yamada, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/830,526

(22) Filed: Mar. 26, 2020

(65) Prior Publication Data
US 2020/0310734 A1    Oct. 1, 2020

(30) Foreign Application Priority Data

Mar. 28, 2019  (JP) .............................. JP2019-062581

(51) Int. Cl.
*G06F 3/147* (2006.01)
*G06F 3/041* (2006.01)
*G06F 3/0483* (2013.01)

(52) U.S. Cl.
CPC ............ *G06F 3/147* (2013.01); *G06F 3/0412* (2013.01); *G06F 3/0483* (2013.01); *G09G 2340/04* (2013.01); *G09G 2380/14* (2013.01)

(58) Field of Classification Search
None
See application file for complete search history.

(56) References Cited

U.S. PATENT DOCUMENTS

2012/0204099 A1    8/2012  Yamada
2012/0287165 A1    11/2012 Yamada

FOREIGN PATENT DOCUMENTS

| JP | 2011-221586 A | 11/2011 |
| JP | 2012-164292 A | 8/2012 |
| JP | 2012-238223 A | 12/2012 |

OTHER PUBLICATIONS

Feldmann et al., "Flexible Clipmaps for Managing Growing Textures", 2011. (Year: 2011).*

* cited by examiner

*Primary Examiner* — Nicholas R Wilson
(74) *Attorney, Agent, or Firm* — Harness, Dickey & Pierce, P.L.C.

(57) ABSTRACT

A display method for displaying a plurality of images on a display includes: generating the image with a texture having a resolution corresponding to a size of the image displayed on the display, the texture being selected from a texture memory storing a plurality of textures having different resolutions for the same image; and when storing a plurality of new textures having different resolutions into the texture memory and generating and displaying the image with the new texture but when the texture memory does not have a sufficient free space to store the new textures, deleting the texture stored in the texture memory, from the texture memory, in a lexicographic order from the texture having an old history of use and the texture having a high resolution, and storing the new textures into the free space secured in the texture memory.

10 Claims, 20 Drawing Sheets

10TH FRAME

| MEMORY CAPACITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| TEXTURE ID | T1-1 | | | | T2-1 | | | | T3-1 | | | | T1-2 | | | | T2-2 | | T3-2 | | T1-3 | T2-3 | T3-3 | |
| LAST USED FRAME n | 1 | | | | 10 | | | | 10 | | | | 10 | | | | 10 | | 10 | | 10 | 10 | 10 | |

FIG. 10
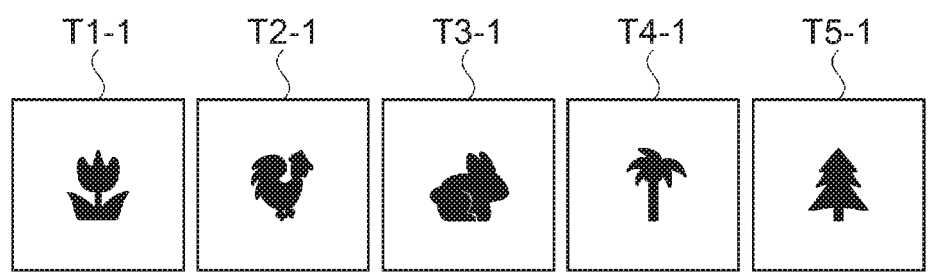
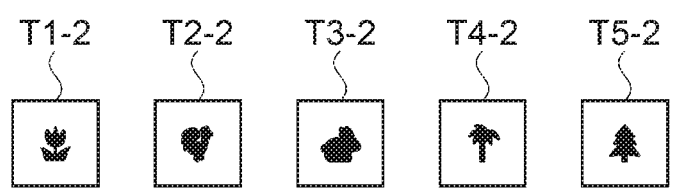
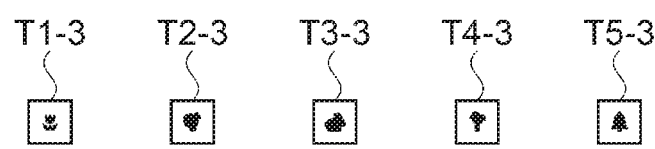
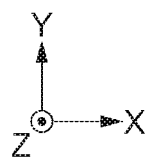

FIG. 11A

10TH FRAME

| MEMORY CAPACITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| TEXTURE ID | T1-1 | | | | T2-1 | | | | T3-1 | | | | T1-2 | | | T2-2 | | T3-2 | | T1-3 | T2-3 | T3-3 | | |
| LAST USED FRAME n | 1 | | | | 10 | | | | 10 | | | | 10 | | | 10 | | 10 | | 10 | 10 | 10 | | |

FIG. 11B

TEXTURE TO BE REGISTERED

| MEMORY CAPACITY | 1 | 2 | 3 | 4 | 5 | 6 | 7 |
|---|---|---|---|---|---|---|---|
| TEXTURE ID | T4-1 | | | | T4-2 | | T4-3 |

FIG. 11C

| MEMORY CAPACITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| TEXTURE ID | T2-1 | | | | | T3-1 | | | T1-2 | | T2-2 | | T3-2 | | T1-3 | T2-3 | T3-3 | | | | | | | |
| LAST USED FRAME n | 10 | | | | | 10 | | | 10 | | 10 | | 10 | | 10 | 10 | 10 | | | | | | | |

FIG. 11D

| MEMORY CAPACITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| TEXTURE ID | T2-1 | | | | T3-1 | | | | T4-1 | | | T1-2 | | T2-2 | | T3-2 | | T4-2 | | T1-3 | T2-3 | T3-3 | T4-3 |
| LAST USED FRAME n | 10 | | | | 10 | | | | 10 | | | 10 | | 10 | | 10 | | 10 | | 10 | 10 | 10 | 10 |

FIG. 12A

20TH FRAME

| MEMORY CAPACITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| TEXTURE ID | T2-1 | | | | T3-1 | | | | T4-1 | | | | T1-2 | | T2-2 | | T3-2 | | T4-2 | | T1-3 | T2-3 | T3-3 | T4-3 |
| LAST USED FRAME n | 20 | | | | 20 | | | | 20 | | | | 10 | | 10 | | 20 | | 20 | | 20 | 20 | 20 | 20 |

FIG. 12B

TEXTURE TO BE REGISTERED

| MEMORY CAPACITY | 1 | 2 | 3 | 4 | 5 | 6 | 7 |
|---|---|---|---|---|---|---|---|
| TEXTURE ID | T5-1 | | | | T5-2 | | T5-3 |

FIG. 12C

| MEMORY CAPACITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| TEXTURE ID | T3-1 | | | | T4-1 | | | T3-2 | | T4-2 | | T1-3 | T2-3 | T3-3 | T4-3 | | | | | | | | |
| LAST USED FRAME n | 20 | | | | 20 | | | 20 | | 20 | | 20 | 20 | 20 | 20 | | | | | | | | |

FIG. 12D

| MEMORY CAPACITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| TEXTURE ID | T3-1 | | | | T4-1 | | | | T5-1 | | | | T3-2 | | T4-2 | | T5-2 | | T1-3 | T2-3 | T3-3 | T4-3 | T5-3 | |
| LAST USED FRAME n | 20 | | | | 20 | | | | 20 | | | | 20 | | 20 | | 20 | | 20 | 20 | 20 | 20 | 20 | |

DISPLAY METHOD, DISPLAY DEVICE, AND DISPLAY PROGRAM

The present application is based on, and claims priority from JP Application Ser. Num. 2019-062,581, filed Mar. 28, 2019, the disclosure of which is hereby incorporated by reference herein in its entirety.

BACKGROUND

1. Technical Field

The present disclosure relates to a display method, a display device, and a display program.

2. Related Art

In order for a user to grasp a content of document data including a plurality of pages, a technique of generating a thumbnail image for each of the plurality of pages and displaying a list of the resulting plurality of thumbnail images arranged next to each other or superimposed on each other has been developed and disclosed in JP-A-2011-221586.

However, in the display method described in JP-A-2011-221586, the resolution of the thumbnail image does not correspond to the size of the displayed image. The image is blurred when the resolution is low, whereas the image is noticeably jaggy when the resolution is too high. Therefore, the display method has a problem in that the image does not have an optimal resolution corresponding to the size of the image and that the visibility of the displayed image may be poor, depending the size of the image.

SUMMARY

A display method according to an aspect of the present disclosure is a display method for displaying a plurality of images on a display and including: generating the image with a texture having a resolution corresponding to a size of the image displayed on the display, the texture being selected from a texture memory storing a plurality of textures having different resolutions for the same image; and when storing a plurality of new textures having different resolutions into the texture memory and generating and displaying the image with the new texture but when the texture memory does not have a sufficient free space to store the new textures, deleting the texture stored in the texture memory, from the texture memory, in a lexicographic order from the texture having an old history of use and the texture having a high resolution, and storing the new textures into the free space secured in the texture memory.

In the display method, the texture stored in the texture memory may be selected from texture data in which the textures having different resolutions are stored.

In the display method, the texture stored in the texture data may be a mipmap resulting from similarly reducing the resolution in a longitudinal direction and the resolution in a lateral direction of the texture.

In the display method, the texture stored in the texture data may be a ripmap resulting from separately reducing the resolution in a longitudinal direction and the resolution in a lateral direction of the texture.

In the display method, the texture stored in the texture data may be a ripmap in which the texture has the same resolution in a longitudinal direction and has the resolution in a lateral direction reduced.

A display device according to another aspect of the present disclosure includes: a display displaying a plurality of images; and a controller generating the image with a texture having a resolution corresponding to a size of the image displayed on the display, the texture being selected from a texture memory storing a plurality of textures having different resolutions for the same image, the controller deleting the texture stored in the texture memory, from the texture memory, in a lexicographic order from the texture having an old history of use and the texture having a high resolution, when storing a plurality of new textures having different resolutions into the texture memory and generating and displaying the image with the new texture but when the texture memory does not have a sufficient free space to store the new textures, the controller storing the new textures into the free space secured in the texture memory and displaying the generated image on the display.

A non-transitory computer-readable storage medium according to still another aspect of the present disclosure stores a display program for displaying a plurality of images on a display. The display program causes a computer to function as: a selection unit selecting a texture having a resolution corresponding to a size of the image displayed on the display, from a texture memory storing a plurality of textures having different resolutions for the same image; a texture storage deleting the texture stored in the texture memory, from the texture memory, in a lexicographic order from the texture having an old history of use and the texture having a high resolution, when storing a plurality of new textures having different resolutions into the texture memory and generating and displaying the image with the new texture but when the texture memory does not have a sufficient free space to store the new textures, the texture storage storing the new textures into the free space secured in the texture memory; an image generation unit generating the image with the texture selected from the texture memory; and an image display displaying the generated image on the display.

A display method according to still another aspect of the present disclosure is a display method for displaying a plurality of images on a display and including: generating the image with a texture having a resolution corresponding to a size of the image displayed on the display, the texture being selected from a texture memory storing a plurality of textures having different resolutions for the same image; and when storing a plurality of new textures having different resolutions into the texture memory and generating and displaying the image but when the texture memory does not have a sufficient free space and the free space is not sufficient even after the texture is deleted in a lexicographic order from the texture having an old history of use and the texture having a high resolution, deleting the texture from the texture memory in order from the texture having a high resolution for each of the images, and storing the new textures into the free space secured in the texture memory.

In the display method, the free space may be secured by not storing the new texture, of the plurality of new textures having the different resolutions, in order from the new texture having a high resolution.

A display method according to still another aspect of the present disclosure is a display method for displaying a plurality of images on a display and including: generating the image with a texture having a resolution corresponding to a size of the image displayed on the display, the texture being selected from a texture memory storing a plurality of textures having different resolutions for the same image; and when storing a plurality of new textures having different resolutions into the texture memory and generating and displaying the image but when the texture memory does not have a sufficient free space to store the new textures, holding a deletion priority order that is different from an order from the texture having an old history of use and the texture having a high resolution, for each of the images, then deleting the texture stored in the texture memory, from the texture memory, in a lexicographic order from the texture having the old history of use, the texture having the high resolution, and the deletion priority order, and storing the new textures into the free space secured in the texture memory.

BRIEF DESCRIPTION OF THE DRAWINGS

FIG. 10 illustrates texture registration processing to a texture memory.

FIG. 11A illustrates the texture registration processing to the texture memory.

FIG. 11B illustrates the texture registration processing to the texture memory.

FIG. 11C illustrates the texture registration processing to the texture memory.

FIG. 11D illustrates the texture registration processing to the texture memory.

FIG. 12A illustrates the texture registration processing to the texture memory.

FIG. 12B illustrates the texture registration processing to the texture memory.

FIG. 12C illustrates the texture registration processing to the texture memory.

FIG. 12D illustrates the texture registration processing to the texture memory.

DESCRIPTION OF EXEMPLARY EMBODIMENTS

Figure 1:
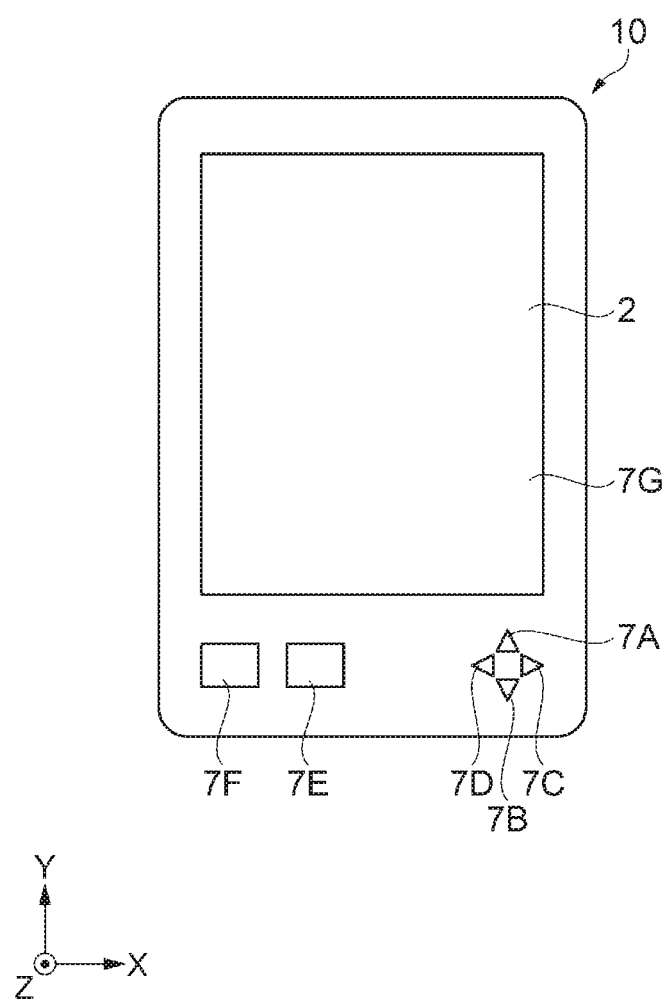
FIG. 1 shows the exterior of a viewer according to a first embodiment.

A display method, a display device, and a display program according to an embodiment will now be described with reference to the drawings. In the embodiment, a viewer on which an electronic manual or electronic book as an example of a literature including an image or a literature prepared by a user can be browsed and edited is described as an example of the display device. In the drawings referred to in the description below, for the sake of convenience of the description and illustration, the longitudinal and lateral scales of a member or part may differ from reality. Components other than those necessary for the description may be omitted from the illustrations. In the description below, for the sake of convenience of the description, three axes orthogonal to each other, X-axis, Y-axis, and Z-axis, are shown in FIGS. 1, 2, 3A, 3B, 7, 10, and 13. The direction indicated by the head of the arrow representing each axis is defined as "+". The direction toward the rear of the arrow is defined as "−". A direction along the X-axis is referred to as a "lateral direction". A direction along with the Y-axis is referred to as a "longitudinal direction". It is assumed that, as the lateral directions, a −X-direction is the left or to the left and a +X-direction is the right or to the right. It is also assumed that, as the longitudinal directions, a −Y-direction is down or below and a +Y-direction is up or above.

First Embodiment

Outline of Viewer

First, an outline of a viewer 10 according to a first embodiment will be described with reference to FIGS. 1, 2, 3A, and 3B.

Figure 2:
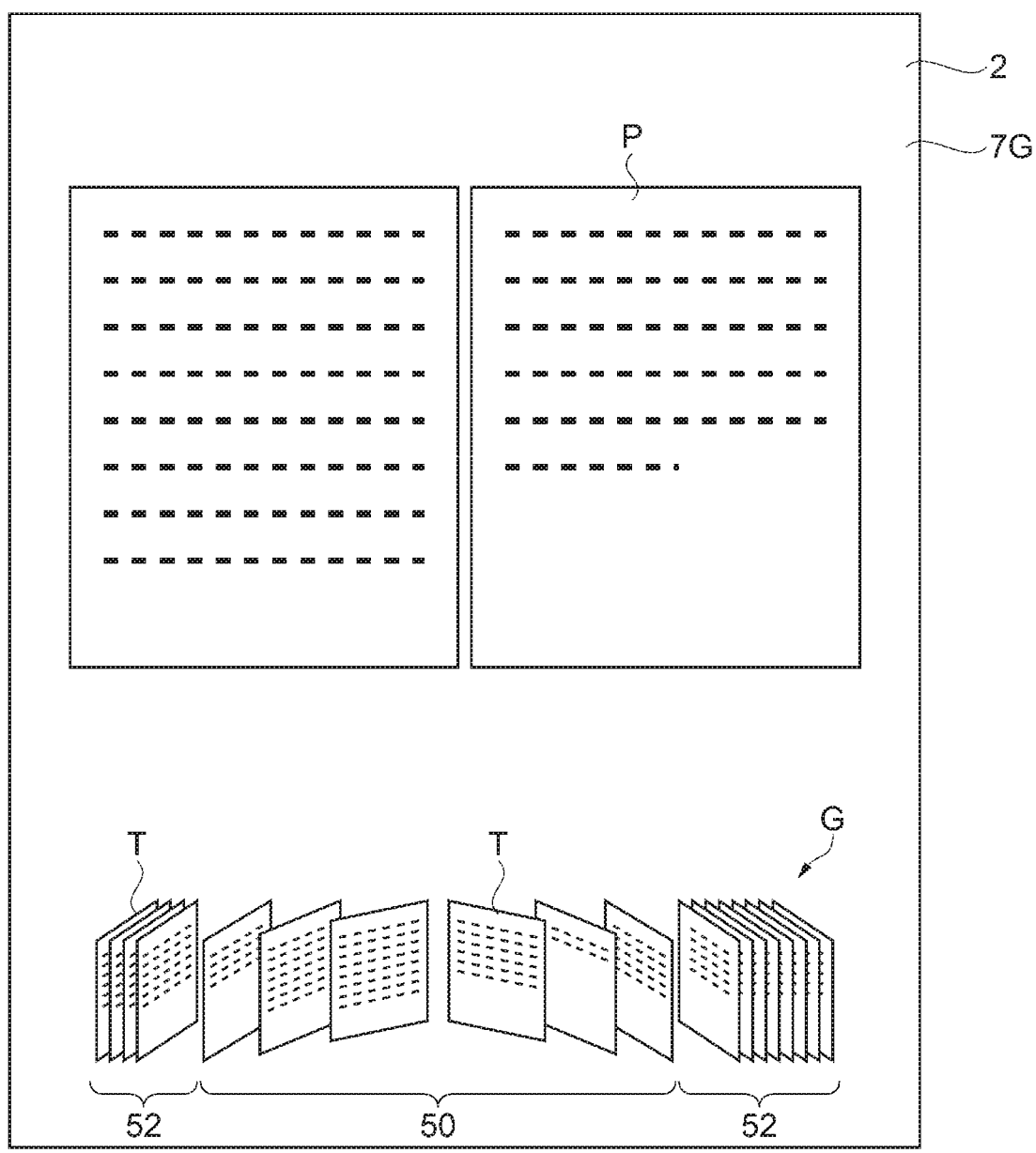
FIG. 2 shows a plurality of images displayed at an image display unit.
Figure 3A:
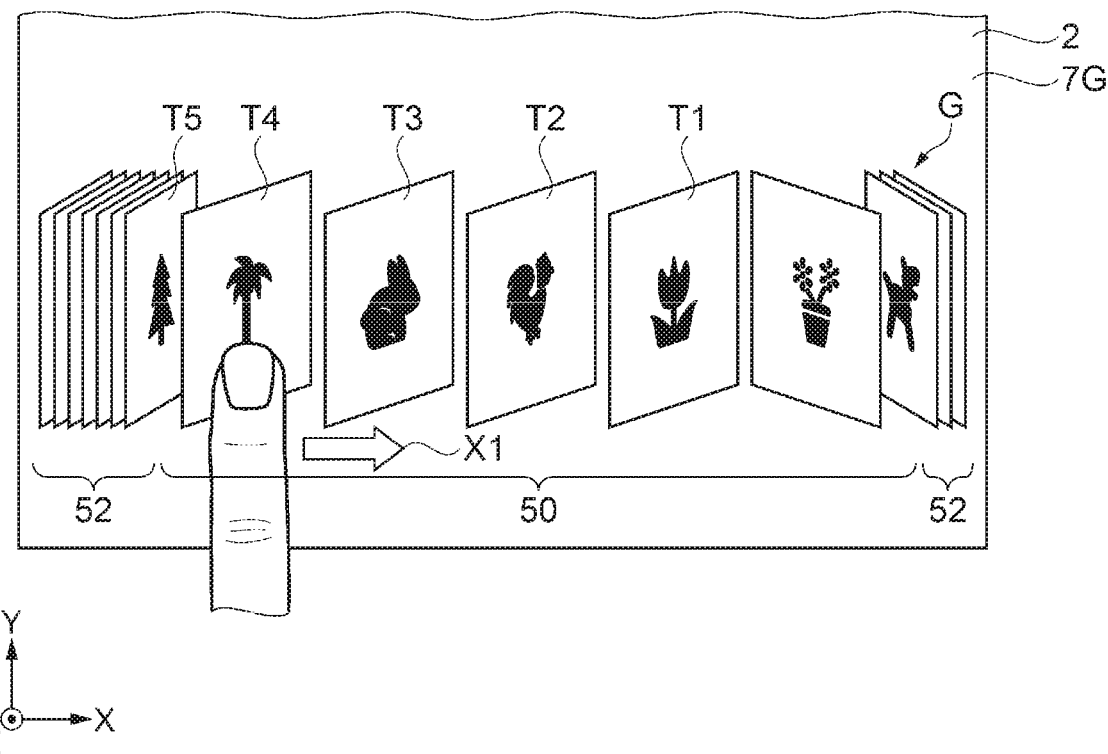
FIG. 3A shows a plurality of images displayed on the image display unit.
Figure 3B:
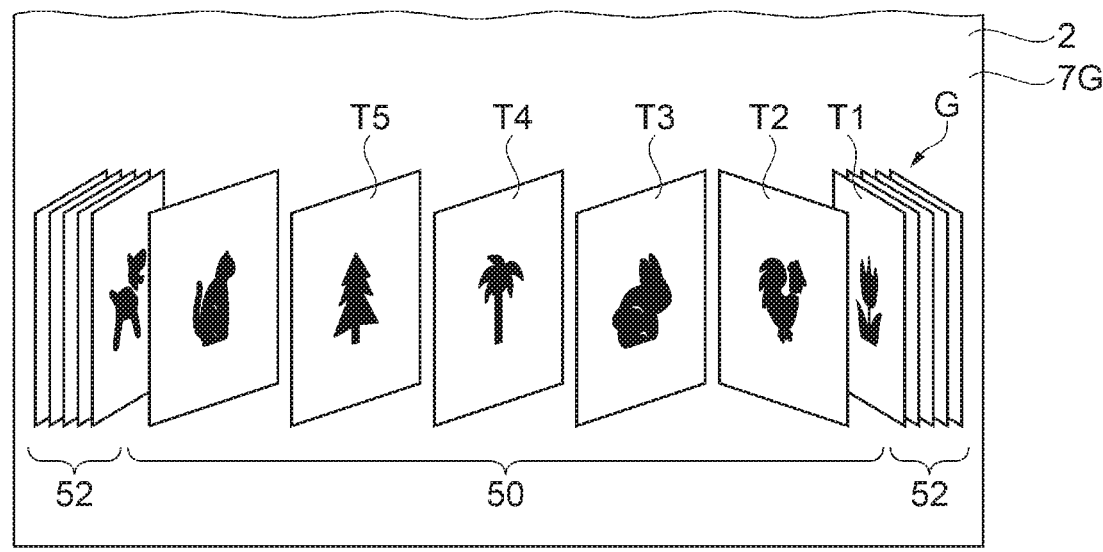
FIG. 3B shows a plurality of images displayed on the image display unit.

FIG. 1 shows the exterior of the viewer according to the first embodiment. FIG. 1 is a front view of the viewer 10, as viewed on the side where an image display unit 2 as a display unit is provided. FIGS. 2, 3A, and 3B show a plurality of images T displayed on the image display unit 2.

The viewer 10 according to this embodiment is a display device displaying an image. In this example, the viewer 10 is a device for browsing an electronic book as an example of a document, that is, a so-called e-book reader. The electronic book is literature data including images of a plurality of pages. The viewer 10 displays the electronic book on the image display unit 2 in certain units. The certain units refer to, for example, page by page. Of the plurality of pages included in the electronic book, a page to be displayed is called a selected page. The selected page is changed according to an operation on buttons 7A to 7F or a touch panel 7G shown in FIG. 1 by the user. That is, the user can turn pages of the electronic book or enlarge the displayed selected page by operating the buttons 7A to 7F or the touch panel 7G. The viewer 10 also has the function of executing an application program in addition to browsing the electronic book.

The image display unit 2 according to this embodiment displays, at a lower part of the image display unit 2, an image group G formed of a plurality of images T of respective pages of an electronic manual, an electronic book, or a literature prepared by the user, arranged next to each other in the lateral direction. When an instruction to enlarge an image T from the image group G is given, the image display unit 2 displays an enlarged image P above the image group G, as shown in FIG. 2.

The image group G is arranged in such a way that images T are arranged at equal intervals in a static part 52 and that images T in a dynamic part 50 in the middle are arranged at larger intervals than the images T in the static part 52. The image group G is arranged in the middle in the lateral direction of the image display unit 2 and arranged along the base of the image display unit 2.

The image T is an image having a size occupying a part of the image display unit 2. A plurality of textures having different resolutions forming a mipmap are stored in a texture memory. After a mipmap of an original image is prepared, the image T is drawn and generated with a texture having a resolution corresponding to the size of the image T displayed on the image display unit 2, selected from the texture memory. The mipmap is an aggregate of textures resulting from similarly reducing the resolutions in the longitudinal direction and the lateral direction of the original image by a power of two. Many textures forming the prepared mipmap and having different resolutions are stored in texture data. The texture memory is a memory selecting and storing a texture having a resolution corresponding to the size of the image T, from the texture data. This can increase the speed of drawing the image T.

The original image is an image of a page of the electronic manual, the electronic book, or the literature data prepared by the user. The original image may also be an icon of an application program, or an operation screen of an application program. An application program and its operation may be allocated to each of the plurality of images T.

Touching the touch panel 7G with a finger and swiping in the direction of an arrow X1, as shown in FIG. 3A, causes an image T5 arranged in the left static part 52 to move in the dynamic part 50 and causes an image T1 arranged in the dynamic part 50 to move to the right static part 52, as shown in FIG. 3B. In this way, a dynamic image in which the images T1 to T5 move from left to right can be displayed. On the other hand, swiping in the direction opposite to the direction of the arrow X1 displays a dynamic image in which the images T1 to T5 move from right to left.

The viewer 10 has the buttons 7A to 7F and the touch panel 7G, as an input unit 7, on the face where the image display unit 2 is arranged. The input unit 7 takes in an input from outside. The input unit 7 accepts an operation by the user and processes the operation as an input signal. That is, the user operates the input unit 7 to give a predetermined input to the viewer 10.

System Configuration of Viewer

The system configuration of the viewer 10 will now be described with reference to FIGS. 4 and 5.

Figure 4:
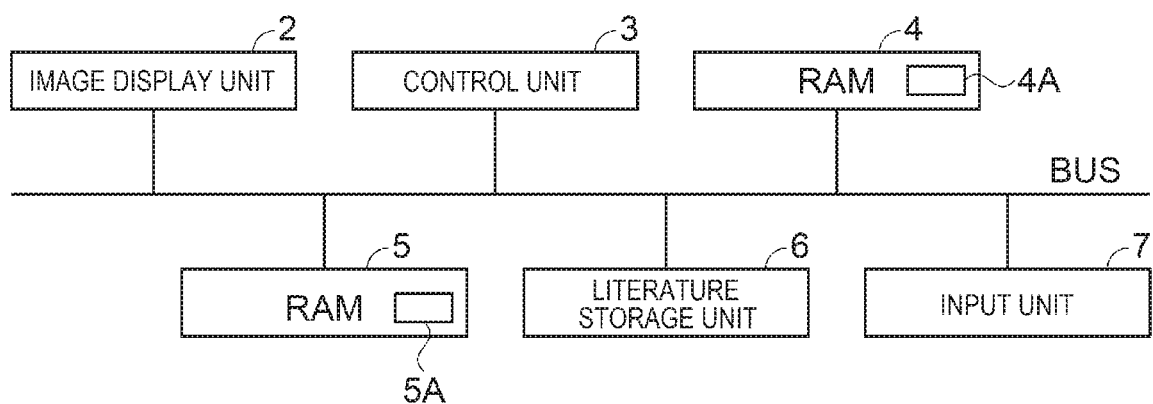
FIG. 4 is a block diagram showing the system configuration of the viewer.
Figure 5:
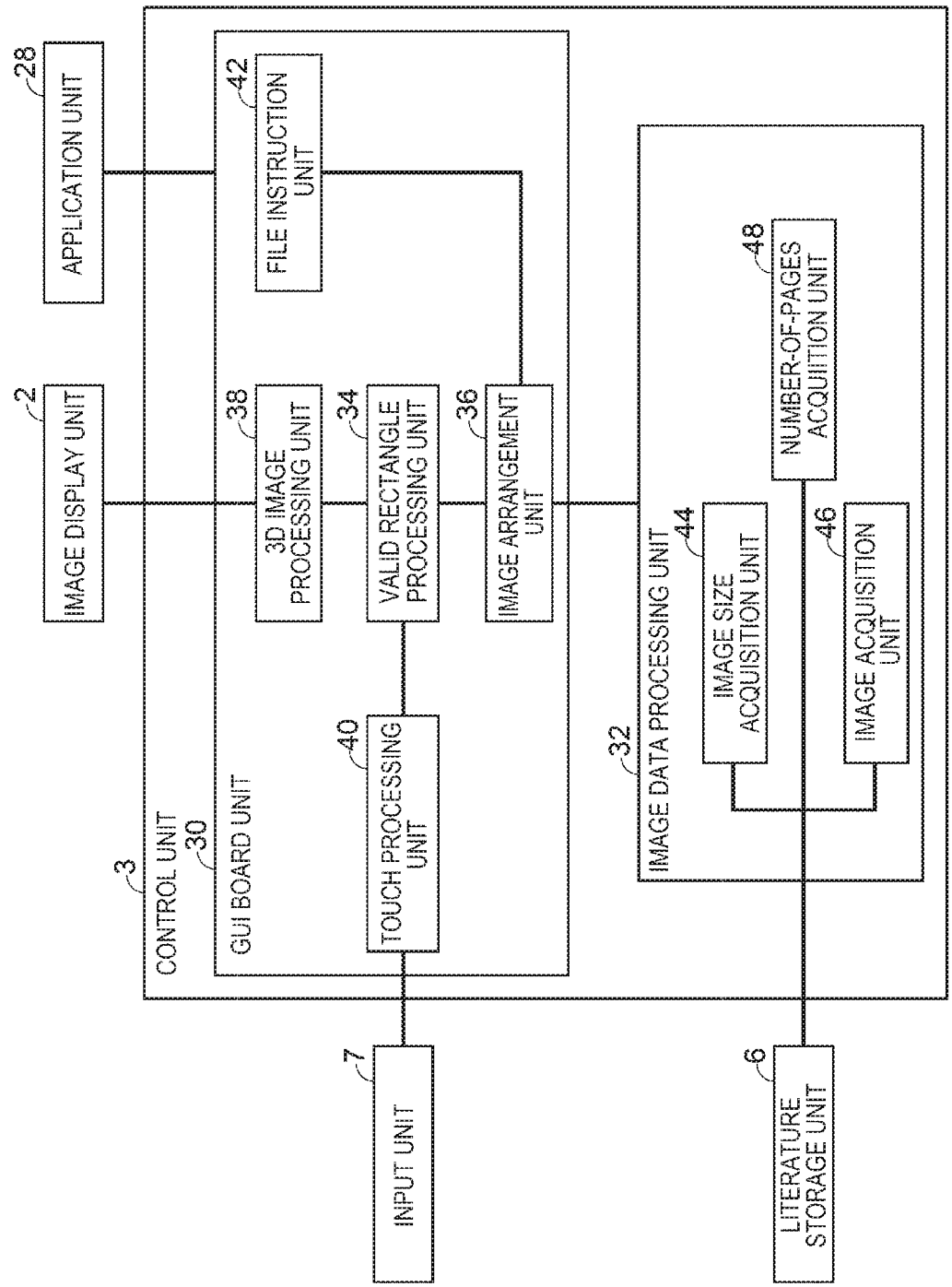
FIG. 5 is a block diagram showing the system configuration of the viewer.

FIGS. 4 and 5 are block diagrams showing the system configuration of the viewer 10.

The viewer 10 has the image display unit 2, a control unit 3, a RAM (random-access memory) 4, a RAM (random-access memory) 5, a literature storage unit 6, and the input unit 7, which are coupled to a bus BUS, as shown in FIG. 4. The exchange of a signal or information between the respective units coupled to the bus BUS is carried out via the bus BUS.

The image display unit 2 displays an image group G in which a plurality of images T corresponding to respective original images are arranged next to each other in the lateral direction. When an enlargement instruction to enlarge an image from the image group G is given, the image display unit 2 enlarges the image T on which the enlargement instruction is given, and displays an enlarged image P above the image group G. When an instruction to move the plurality of images T is given, the image display unit 2 displays a dynamic image in which the plurality of images T move.

The image display unit 2 includes a display drive circuit, not illustrated, outputting a signal to display an image on a liquid crystal panel or the like. The image display unit 2 displays image data stored in the RAM 5, as an image. The image data is an overall image including the image group G formed of the plurality of images T and the enlarged image P displayed in the image display area on the image display unit 2. The image data is a display image frame to be one frame of a dynamic image.

The control unit 3 is a device controlling each part of the viewer 10, for example, a microcomputer having a CPU (central processing unit), a GPU (graphics processing unit), a ROM (read-only memory), and the like. The CPU and the GPU execute a program stored in the ROM or the RAM 5, using the RAM 4 and the RAM 5 as work areas. The CPU prepares a mipmap of the same image T from the respective original images and stores the mipmap into texture data 4A in the RAM 4, which is a dedicated memory for the CPU. The GPU selects a plurality of textures having different resolutions, from the texture data 4A, and stores the selected textures into a texture memory 5A in the RAM 5, which is a dedicated memory for the GPU. The ROM stores, for example, an OS (operating system) program to control basic operations of the viewer 10, and a display program to display the image T on the image display unit 2.

The control unit 3 controls each part of the viewer 10, based on the program stored in the ROM. For example, the control unit 3 performs control to prepare a mipmap from the original image, store the mipmap into the texture data 4A in the RAM 4, select a plurality of textures having different resolutions, from the texture data 4A, and store the selected textures into the texture memory 5A in the RAM 5. The control unit 3 also performs control to specify the buttons 7A to 7F and the touch panel 7G operated by the user and the content of the operation, based on an input signal sent from the input unit 7, and cause the viewer 10 to operate, based on the buttons 7A to 7F and the touch panel 7G thus operated and the content of the operation. The control unit 3 also controls image processing in which a texture having a resolution corresponding to the size of the image T displayed on the image display unit 2 is selected from the texture memory 5A, thus generating the image T accordingly. The image processing may be, for example, processing in which the image T is drawn and generated with the selected texture, processing in which the generated image T is displayed on the image display unit 2, or processing in which the generated image T is shown as a bird's-eye-view image, or the like.

The control unit 3 also selects a texture having a resolution corresponding to the image T displayed on the image display unit 2 from the texture memory 5A storing a plurality of textures having different resolutions for the same image T, then generates the image T with the selected texture, and displays the image T on the image display unit 2.

When storing a new texture having a different resolution from the textures stored in the texture memory 5A, into the texture memory 5A, and generating and displaying the image T with the new texture, but when the texture memory 5A does not have a sufficient free space to store the new texture, the control unit 3 deletes the textures stored in the texture memory 5A, from the texture memory 5A, in a lexicographic order from the texture having an old history of use and the texture having a high resolution, and stores the new texture into the free space secured in the texture memory 5A. The control unit 3 then generates the image T with the new texture and displays the image T on the image display unit 2.

The RAM 4 is a memory storing the content of the image processing executed by the control unit 3 and is a dedicated memory for the CPU. The texture data 4A in the RAM 4 stores the mipmap prepared from the original image on each page. The texture data 4A can store all the textures having different resolutions in the mipmap. Therefore, a texture having a new resolution can be selected from the texture data 4A and stored into the texture memory 5A according to need.

The RAM 5 is a memory storing an association between the content of the image drawing processing executed by the control unit 3 and the image data, and is a dedicated memory for the GPU. The texture memory 5A in the RAM 5 stores a plurality of textures having different resolutions selected from the texture data 4A. Also, the RAM 5 is a memory storing the image data including the image T processed with the texture selected from the texture memory 5A in order to generate the image T to be displayed on the image display unit 2. The image data stored in the RAM 5 is displayed on the image display unit 2.

The RAM 5 is a dedicated memory for the GPU performing the image drawing processing. Therefore, the speed of access to the memory when drawing the image T is high. The image T can be drawn and the image data can be generated at a high speed. This can cope with even a dynamic image.

The literature storage unit 6 is a rewritable memory and stores an electronic manual, an electronic book, or a literature prepared by the user, or the like. The literature storage unit 6 can store a plurality of different literature data. In the literature storage unit 6, the literature data can be rewritten according to need. The literature storage unit 6 is a non-volatile memory storing various data and application programs in addition to the literature data. The literature storage unit 6 may be, for example, a semiconductor memory built in the viewer 10 or a removable external memory such as an SD memory card.

The input unit 7 has the buttons 7A to 7F shown in FIG. 1. When the buttons 7A to 7F are operated, the input unit 7 transmits an input signal corresponding to the operated button to the control unit 3. The input unit 7 has the touch panel 7G.

The control unit 3 has a GUI board unit 30 generating the image T, and an image data processing unit 32, as shown in FIG. 5.

The GUI board unit 30 prepares a mipmap from an original image and stores the mipmap into the texture data 4A in the RAM 4. Subsequently, the GUI board unit 30 selects a texture having a resolution corresponding to the size of the image T displayed on the image display unit 2, from the mipmap, that is, from the texture data 4A storing a plurality of textures having different resolutions, and stores the selected texture into the texture memory 5A in the RAM 5. The GUI board unit 30 selects the texture having the resolution corresponding to the size of the image T displayed on the image display unit 2, from the texture memory 5A, and draws and generates the image T displayed on the image display unit 2 with the selected texture. The GUI board unit 30 can also generate a bird's-eye-view image, which is an image of the image group G arranged in a virtual space, as viewed from an arbitrary viewpoint in the virtual space.

The GUI board unit 30 has a valid rectangle processing unit 34, an image arrangement unit 36, a 3D image processing unit 38, a touch processing unit 40, and a file instruction unit 42.

The valid rectangle processing unit 34 sets a rectangular dimension of the image group G in the image display area on the image display unit 2.

The image arrangement unit 36 divides the image group G formed of a plurality of images T into the static part 52, where the images T are arranged at equal intervals in the state where the images T are displayed as partly overlapping the neighboring images T, and the dynamic part 50, where the images T are arranged at larger intervals than the images T in the static part 52. The image arrangement unit 36 then decides an arrangement position of the plurality of images T in the static part 52 and the dynamic part 50. The image arrangement unit 36 also decides an arrangement position of the enlarged image P.

The 3D image processing unit 38 is, for example, a frame buffer or GPU.

The 3D image processing unit 38 performs calculation processing necessary for image drawing such as 3D graphics. The 3D image processing unit 38 selects a texture having a resolution corresponding to the size of the image T displayed on the image display unit 2, for each of the images T corresponding to the respective pages, from the texture memory 5A in the RAM 5, which is a dedicated memory for the GPU. The 3D image processing unit 38 then draws the image T with the selected texture and generates image data as the image group G. The generated image data is stored into the RAM 5. In the case of a dynamic image, image data as a display image frame is generated for each frame that is displayed.

The touch processing unit 40 detects a touch on the touch panel 7G by the user. The touch processing unit 40 acquires a touch signal from the touch panel 7G.

The file instruction unit 42 instructs the image data processing unit 32 to read the original image of a page of the literature data, based on the data supplied from the touch processing unit 40. The file instruction unit 42 is, for example, a function of Android (trademark registered), which is a mobile operating system.

The image data processing unit 32 is, for example, a PDF library.

The image data processing unit 32 has an image size acquisition unit 44, an image acquisition unit 46, and a number-of-pages acquisition unit 48.

The image size acquisition unit 44 acquires the length in the lateral direction and the length in the longitudinal direction of the original image of a page of the literature data from the literature storage unit 6.

The image acquisition unit 46 acquires the original image of a page of the literature data from the literature storage unit 6.

The number-of-pages acquisition unit 48 acquires the number of pages of the literature data from the literature storage unit 6.

An application unit 28 is, for example, application software such as photograph or document printing software, new year card printing software, or projection software to project a photograph or document with a projector.

Operations of Viewer

The operations of the viewer 10 will now be described with reference to FIGS. 6 to 12D.

Figure 6:
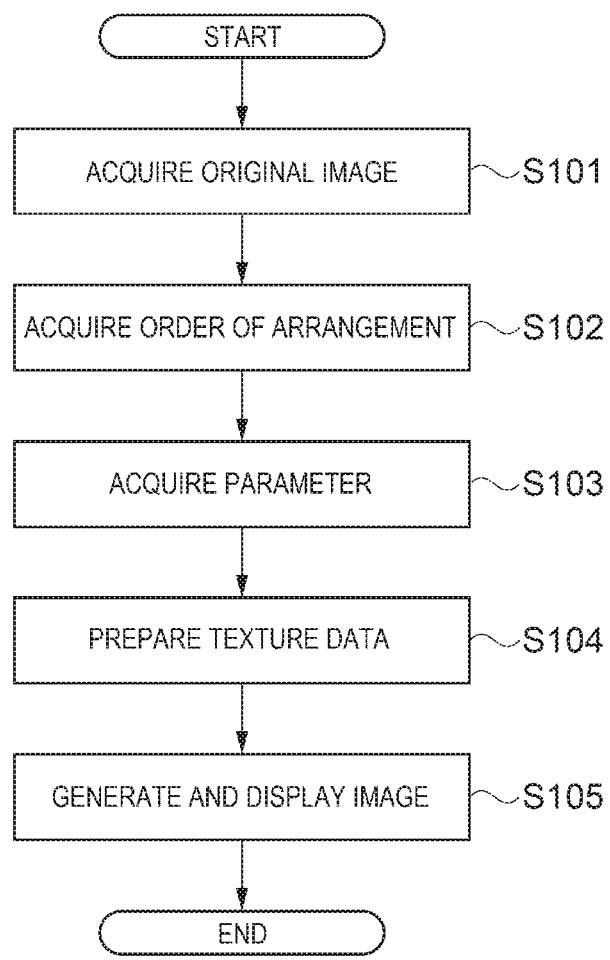
FIG. 6 is a flowchart showing an example of the processing by the viewer.
Figure 7:
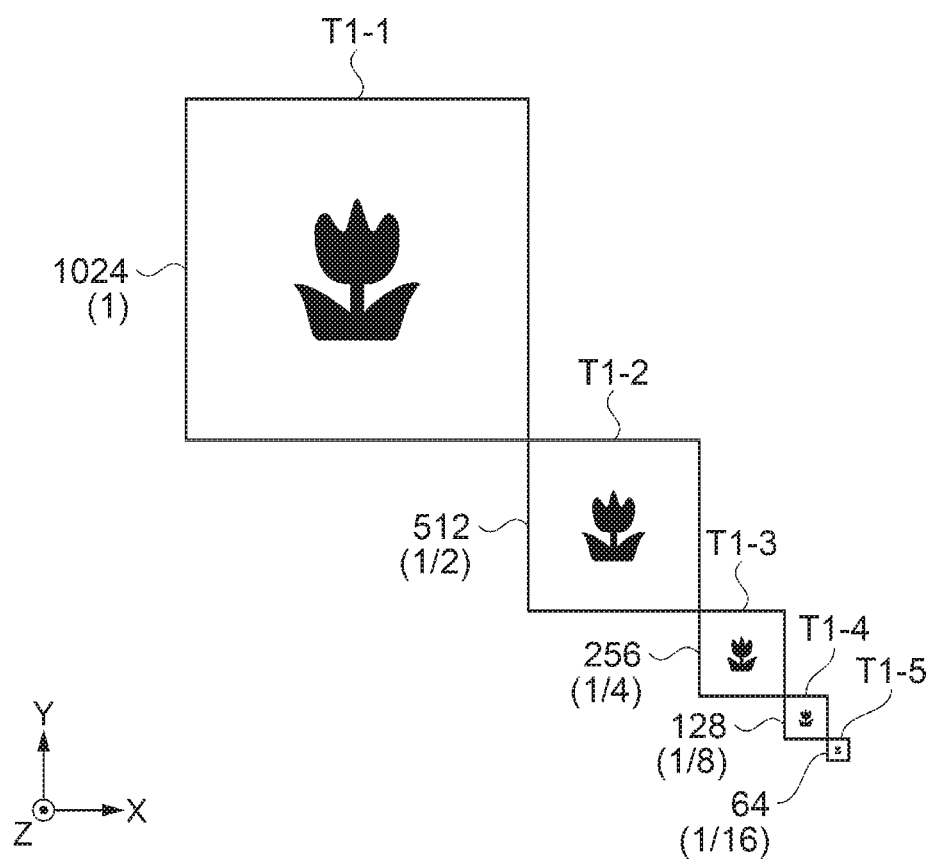
FIG. 7 shows a mipmap according to the first embodiment.
Figure 8:
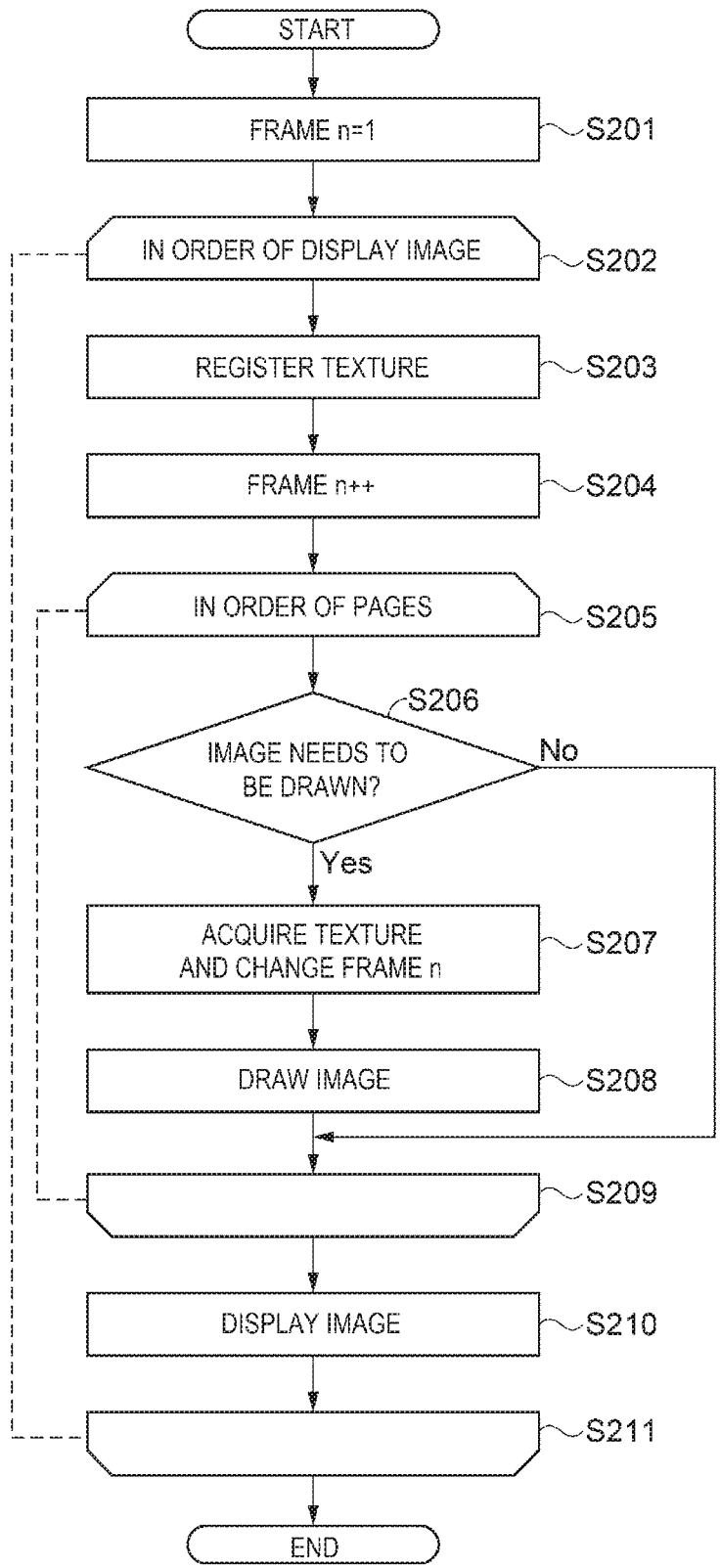
FIG. 8 is a flowchart showing an example of the processing by viewer.
Figure 9:
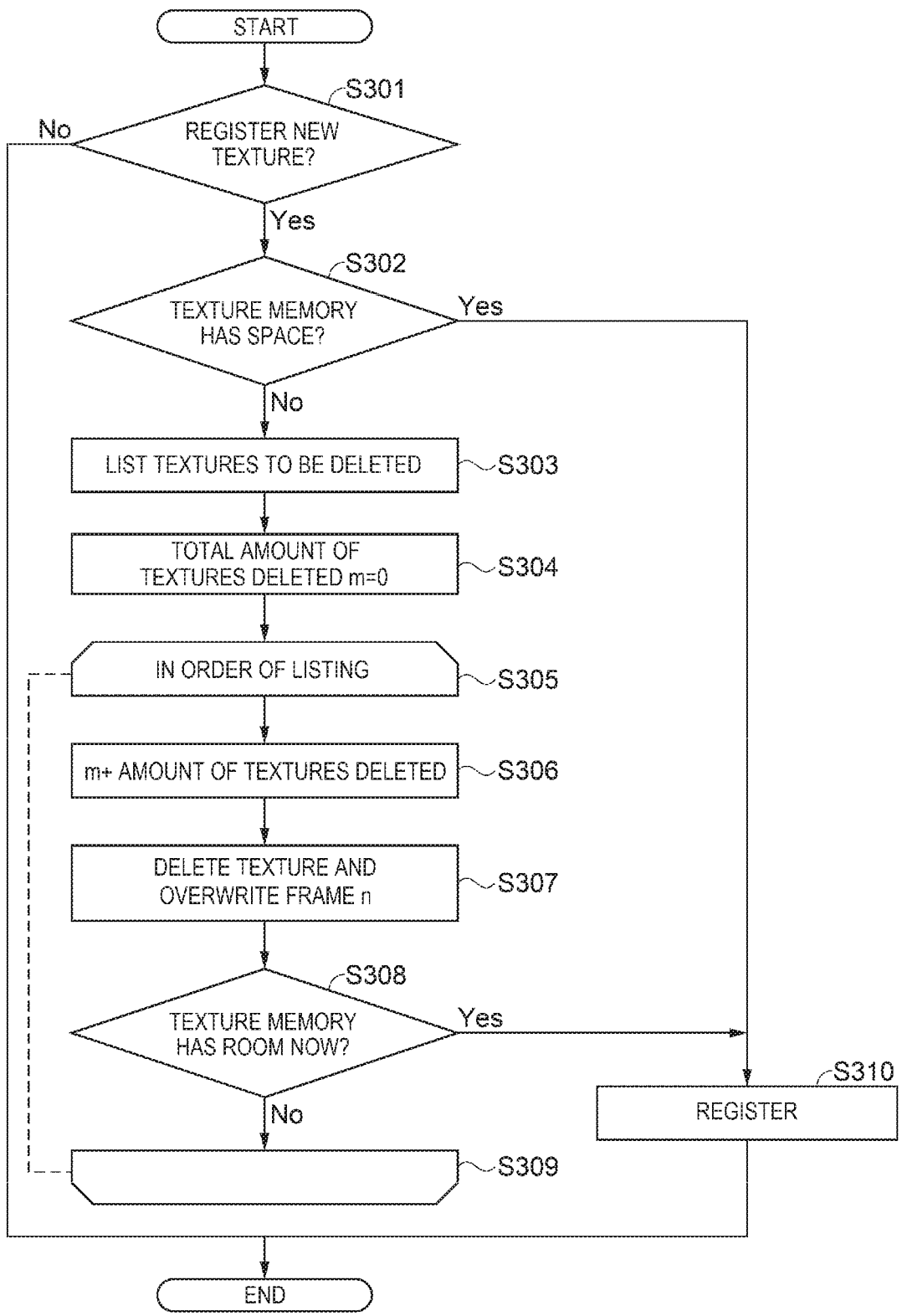
FIG. 9 is a flowchart showing an example of the processing by the viewer.

FIGS. 6, 8, and 9 are flowcharts showing an example of the processing by the viewer 10. FIG. 7 shows a mipmap according to the first embodiment. FIGS. 10 to 12D illustrate texture registration processing to the texture memory. The operations of the control unit 3 will now be described with reference to the flowcharts in FIGS. 6, 8, and 9, and also with reference to FIG. 4.

The flow in FIG. 6 is started by a predetermined event, for example, that the power of the viewer 10 is turned on, or for example, that an instruction to display a menu screen is given in the viewer 10.

First, in step S101, the control unit 3 acquires the original image of an image T as a processing target, in this example, the original images of a plurality of images T forming the image group G, from the literature storage unit 6.

Next, in step S102, the control unit 3 acquires data representing the order of arrangement of the plurality of images T from the literature storage unit 6. This data includes identifiers of the images T and numbers indicating the order of arrangement.

Next, in step S103, the control unit 3 acquires parameters used to display the image group G. These parameters are stored in the literature storage unit 6 along with the identifiers of the image group G. The parameters acquired here include the number of images and the width dimension of the images. The number of images is a parameter indicating the number of images T included in the image group G. The width dimension of the images is a parameter indicating the length in the lateral direction of the image group G.

Next, in step S104, the control unit 3 causes the GUI board unit 30 to prepare a mipmap of the same image T corresponding to each page, based on the original image of each page, and thus prepares the texture data 4A. Specifically, the control unit 3 causes the GUI board unit to prepare textures having the resolutions in the longitudinal direction and the lateral direction similarly reduced by a power of two from the original image of each page acquired in step S101, and stores all the mipmaps corresponding to the respective pages into the texture data 4A in the RAM 4.

Now, the mipmap prepared by the GUI board unit 30 will be described.

The control unit 3 causes the GUI board unit 30 to prepare, for example, a mipmap formed of a texture T1-1 having a resolution of 1024 pixels in the longitudinal direction and the lateral direction, a texture T1-2 having a resolution of 512 pixels in the longitudinal direction and the lateral direction, a texture T1-3 having a resolution of 256 pixels in the longitudinal direction and the lateral direction, a texture T1-4 having a resolution of 128 pixels in the longitudinal direction and the lateral direction, and a texture T1-5 having a resolution of 64 pixels in the longitudinal direction and the lateral direction, as shown in FIG. 7, from the original image of each page, and stores the mipmap into the texture data 4A in the RAM 4. The mipmap can be prepared by executing a mipmap preparation program stored in the RAM 5. In this embodiment, a mipmap formed of the textures T1-1 to T1-5 having the resolutions of 1024 to 64 pixels, that is, a mipmap formed of textures having resolutions equal to, ½, ¼, ⅛, and 1/16 of the resolution of 1024 pixels of a reference texture, is employed. However, this is not limiting. Textures having resolutions of 32 pixels, 16 pixels, 8 pixels and the like, or textures having higher resolutions than 1024 pixels may be employed. The resolution of the texture may be set according to the size of the image display unit 2 and the size of the image T displayed on the image display unit 2.

Next, in step S105, the control unit 3 selects a texture having a resolution corresponding to the size of the image T displayed on the image display unit 2, from the texture data 4A, and registers and stores the selected texture into the texture memory 5A in the RAM 5. Subsequently, the control unit 3 selects a texture having a resolution corresponding to the size of the image T displayed on the image display unit 2, from the texture memory 5A, and draws and generates the image T with the selected texture. The control unit 3 repeats this operation for all the pages, thus generates an image group G from a plurality of images T, and stores the image group G as image data into the RAM 5. Subsequently, the control unit 3 reads out the image data including the generated image T from the RAM 5 and displays the image data as a display image frame on the image display unit 2.

The operation of generating the image T and displaying the image T on the image display unit 2 will now be described with reference to the flowchart in FIG. 8.

First, in step S201, the control unit 3 sets a frame n to 1 before starting to generate a display image frame. A display image frame is equivalent to one of a plurality of still images forming a dynamic image. In this embodiment, a display image frame is generated and displayed on the image display unit 2, 60 times per second.

Next, in step S202, the control unit 3 repeatedly generates a display image frame in order of frames.

Next, in step S203, the control unit 3 selects a texture having a resolution necessary to draw the image T displayed on the image display unit 2, from the texture data 4A, and registers and stores the selected texture into the texture memory 5A.

The operation of registering and storing the texture into the texture memory 5A will now be described with reference to the flowchart in FIG. 9.

First, when newly registering and storing a plurality of new textures having different resolutions into the texture memory 5A in step S301, it is "Yes" and the control unit 3 proceeds to step S302. When not registering a new texture, it is "No" and the control unit 3 ends step S203.

Next, when the texture memory 5A has an enough space in step S302, that is, when the texture memory 5A has a space to store the new textures, it is "Yes" and the control unit 3 proceeds to step S310. The control unit 3 registers and stores the new textures into the texture memory 5A. When the texture memory 5A does not have a space to store the new textures, it is "No" and the control unit 3 proceeds to step S303.

Next, in step S302, the control unit 3 lists textures to be deleted from the texture memory 5A in order to secure a space to store the new textures in the texture memory 5A. To list textures to be deleted, candidates to be deleted are extracted in a lexicographic order from a texture "having an old history of use, that is, having a small access frame" and a texture "having a high resolution", except for the texture used for the current display image frame. The listing method will be described in detail later.

Next, in step S304, the control unit 3 sets the total amount of textures deleted m, of the textures to be deleted, that is, the volume of the textures to be deleted, to 0.

Next, in step S305, the control unit 3 repeats the operations in steps S306 to S308 in order of the listing in step S303.

Next, in step S306, the control unit 3 adds the volume of the textures to be deleted to the total amount of textures deleted m.

Next, in step S307, the control unit 3 deletes the listed textures from the texture memory 5A. When the access frame of an affiliated texture group is smaller than "the newest frame except for the current frame with the current resolution, plus 1, and if that is not applicable, the frame where this texture is used last, plus 1", the control unit overwrites the frame n with this frame value. The affiliated texture group refers to a plurality of textures for the same page and having different resolutions.

Next, when, in step S308, the amount of textures deleted, which is the volume of textures deleted, is larger than the volume of the textures to be newly registered and stored as a result of deleting the listed textures in step 308, that is, when the texture memory 5A has a space, it is "Yes" and the control unit 3 proceeds to step S310. The control unit 3 registers and stores the new textures into the texture memory 5A. When the texture memory 5A still does not have a space, it is "No" and the control unit 3 proceeds to step S309. The control unit 3 repeats the operations in steps S306 to S308 in order of the listing.

The method for listing textures to be deleted will now be described in detail with reference to FIGS. 10 to 12D.

When the mipmap stored in the texture data 4A includes textures T1-1 to T5-3 having different resolutions for each page, as shown in FIG. 10, the textures T1-1 to T3-3 are registered and stored in the texture memory 5A for the tenth frame, as shown in FIG. 11A. As an example, the texture memory 5A has a capacity to store 24 textures T1-3 having a resolution of 256 pixels and stores the last used frame n of each texture.

It is now assumed that textures T4-1 to T4-3 as shown in FIG. 11B are to be newly registered into the texture memory 5A. The texture memory 5A shown in FIG. 11A has a free space for three textures T1-3 having the resolution of 256 pixels. Therefore, the new textures T4-1 to T4-3 equivalent to seven textures T1-3 having the resolution of 256 pixels cannot be registered into the texture memory 5A.

Thus, candidates to be deleted are listed from among the textures T1-1 to T3-3 stored in the texture memory 5A, in a lexicographic order from a texture "having an old history of use, that is, having a small access frame" and a texture "having a high resolution". First, the texture T1-1 having the frame n of 1 is selected as the last used texture with a small access frame. The volume of the texture T1-1 is equivalent to four textures T1-3 having the resolution of 256 pixels. The current free space is equivalent to three texture T1-3 having the resolution of 256 pixels. Therefore, deleting the texture T1-1 results in a free space in the texture memory 5A equivalent to seven textures T1-3 having the resolution of 256 pixels, as shown in FIG. 11C. This enables the registration of the new textures T4-1 to T4-3. Thus, the new textures T4-1 to T4-3 can be registered and stored into the texture memory 5A, as shown in FIG. 11D.

It is now assumed that textures T5-1 to T5-3 as shown in FIG. 12B are to be newly registered into the texture memory 5A as shown in FIG. 12A, for the 20th frame. The texture memory 5A shown in FIG. 12A has no free space. Therefore, the new textures T5-1 to T5-3 cannot be registered into the texture memory 5A.

Thus, candidates to be deleted are listed from among the textures T2-1 to T4-3 stored in the texture memory 5A, in a lexicographic order from a texture "having an old history of use, that is, having a small access frame" and a texture "having a high resolution". First, the texture T1-2 and the texture T2-2 having the frame n of 10 are selected as the last used texture with a small access frame. Then, there is no texture having a small access frame and the other textures T2-1 to T4-3, excluding the textures T1-2 and T2-2, have the same frame n of 20. Therefore, candidates are selected in order from a texture "having a high resolution", that is, in order of the texture T2-1, the texture T3-1, and the texture T4-1. When the textures have the same frame n, the texture arranged on the left side is given priority. Therefore, the textures are listed in order of the texture T1-2, the texture T2-2, the texture T2-1, the texture T3-1, and the texture T4-1.

The volume of the textures T5-1 to T5-3 to be newly registered is equivalent to seven textures T1-3 having the resolution of 256 pixels. Therefore, deleting the texture T1-2, the texture T2-2, and the texture T2-1 can secure capacity for eight textures T1-3 having the resolution of 256 pixels, as shown in FIG. 12C. Thus, the new textures T5-1 to T5-3 can be registered and stored into the texture memory 5A, as shown in FIG. 12D. This is equivalent to the texture storage unit of the display program.

Back to FIG. 8, in step S204, the control unit 3 adds 1 to the frame n.

Next, in step S205, the control unit 3 repeats the operations in steps S206 to S208 in order of pages and thus draws and generates the images T of all the pages.

Next, when the image T needs to be drawn in step S206, it is "Yes" and the control unit 3 proceeds to step S207. When the image T need not be drawn, it is "No" and the control unit 3 proceeds to step S209 and repeats the operations in steps S206 to S208. When the image T need not be drawn refers to when the image T generated in the previous frame can be used as it is, where images are arranged in the static part 52 or where a still image move in the dynamic part 50, as shown in FIGS. 3A and 3B. Thus, there is no need to draw the image T again.

Next, in step S207, the control unit 3 selects and acquires a texture having a resolution corresponding to the size of the image T displayed on the image display unit 2, from the texture memory 5A. This is equivalent to the selection unit of the display program. The control unit 3 also changes the last used frame n of the texture stored in the texture memory 5A to the frame n updated in step S204.

Next, in step S208, the control unit 3 draws and generates the image T, using the texture having the resolution corresponding to the size of the image T displayed on the image display unit 2, selected and acquired from the texture memory 5A. This is equivalent to the image generation unit of the display program. The control unit 3 stores the generated image T into the RAM 5. Subsequently, on finishing the operations in steps S206 to S208 for all the pages, the control unit 3 proceeds to step S210.

Next, in step S210, the control unit 3 reads out the image T corresponding to each page stored in the RAM 5, generates the image group G, and stores the image group G into the RAM 5 as image data. Thus, a display image frame is generated as one frame of a dynamic image. Subsequently, the control unit 3 reads out the image data from the RAM 5 and displays the image data on the image display unit 2 as a display image frame. This is equivalent to the image display unit of the display program.

Next, after proceeding to step S211, the control unit 3 returns to step S202 and repeats the operations in steps S203 to S210 in order of display image frames.

As described above, repeating the flow of steps S202 to S211 shown in FIG. 8 enables the image group G including a plurality of images T to be displayed on the image display unit 2 as a dynamic image.

The flow in FIG. 6 ends in response to a predetermined event, for example, that the power of the viewer 10 is turned off, or for example, that an instruction to end the display of the menu screen is given in the viewer 10.

According to the display method, the viewer 10 as a display device, and the display program as described above, the image T displayed on the image display unit 2 is generated with the texture having the resolution corresponding to the size of the image T displayed on the image display unit 2, selected from the texture memory 5A. Therefore, the resulting image is highly visible instead of being blurred or noticeably jaggy.

To store a new texture into the texture memory 5A and generating and displaying the image T with the new texture, textures are deleted from the texture memory 5A in a lexicographic order from a texture having an old history of use and a texture having a high resolution. Thus, a space to store the new texture can be secured without increasing the capacity of the texture memory 5A.

Also, a texture having a new resolution can be selected from the texture data 4A storing textures having different resolutions and can be easily stored into the texture memory 5A, according to need.

The texture stored in the texture data 4A is a mipmap. Therefore, textures having many resolutions resulting from similarly reducing the resolutions in the longitudinal direction and the lateral direction of the texture can be stored. Thus, a texture having a resolution corresponding to the size of the image T displayed on the image display unit 2 can be easily selected and stored into the texture memory 5A.

Second Embodiment

The texture data 4A according to a second embodiment will now be described with reference to FIG. 13.

Figure 13:
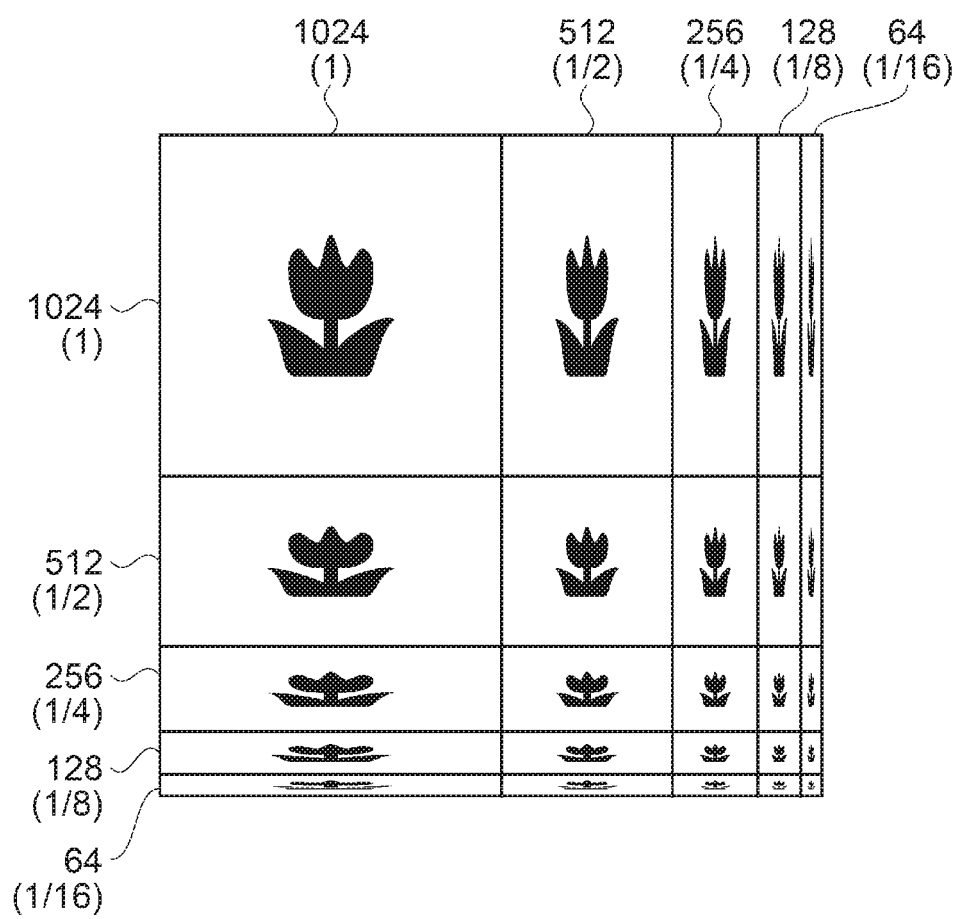
FIG. 13 shows a ripmap according to a second embodiment.

FIG. 13 shows a ripmap according to the second embodiment.

Differences from the first embodiment will be mainly described and similar matters will not be described further. This embodiment is similar to the first embodiment except that the textures stored in the texture data 4A form a ripmap.

The texture data 4A according to this embodiment is a ripmap resulting from separately reducing the resolution in the longitudinal direction and the resolution in the lateral direction by a power of two. For example, the ripmap is formed of textures having a resolution of 1024 pixels in the longitudinal direction and resolutions of 1024 pixels, 512 pixels, 256 pixels, 128 pixels, and 64 pixels in the lateral direction, textures having a resolution of 512 pixels in the longitudinal direction and resolutions of 1024 pixels, 512 pixels, 256 pixels, 128 pixels, and 64 pixels in the lateral direction, textures having a resolution of 256 pixels in the longitudinal direction and resolutions of 1024 pixels, 512 pixels, 256 pixels, 128 pixels, and 64 pixels in the lateral direction, textures having a resolution of 128 pixels in the longitudinal direction and resolutions of 1024 pixels, 512 pixels, 256 pixels, 128 pixels, and 64 pixels in the lateral direction, and textures having a resolution of 1024 pixels in the longitudinal direction and resolutions of 64 pixels, 512 pixels, 256 pixels, 128 pixels, and 64 pixels in the lateral direction, as shown in FIG. 13. The ripmap can be prepared by executing a ripmap preparation program stored in the RAM 5.

Since the textures stored in the texture data 4A form a ripmap, as described above, textures having a greater number of resolutions resulting from separately reducing the resolution in the longitudinal direction and the resolution in the lateral direction of the texture can be stored. Thus, a texture having a resolution corresponding to the image displayed on the image display unit 2 can be easily selected and stored into the texture memory 5A. This can achieve effects similar to those of the first embodiment.

Third Embodiment

The texture data 4A according to a third embodiment will now be described with reference to FIG. 14.

Figure 14:
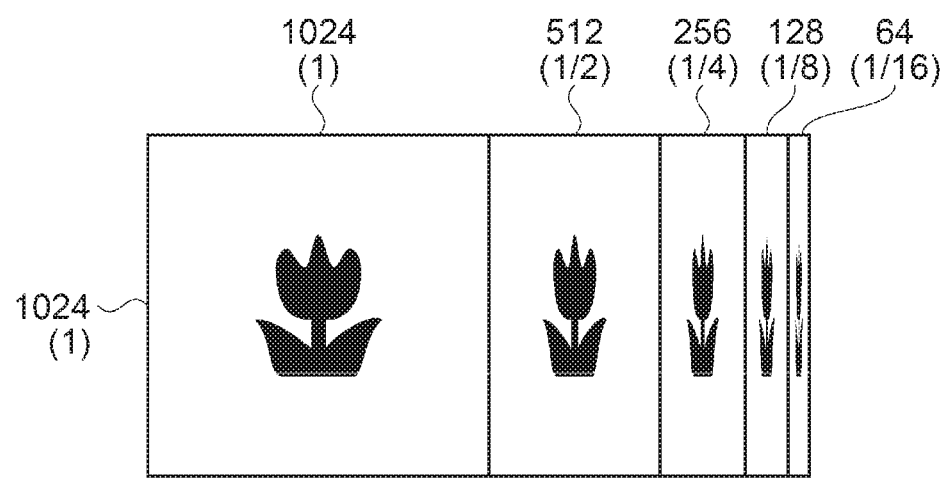
FIG. 14 shows a ripmap according to a third embodiment.

FIG. 14 shows a ripmap according to the third embodiment.

Differences from the first embodiment will be mainly described and similar matters will not be described further. This embodiment is similar to the first embodiment except that the textures stored in the texture data 4A form a ripmap in which the textures have the same resolution in the longitudinal direction and have the resolution in the lateral direction reduced.

The texture data 4A according to this embodiment is a ripmap in which the textures have the same resolution in the longitudinal direction and have the resolution in the lateral direction reduced by a power of two. For example, the ripmap is formed of textures having a resolution of 1024 pixels in the longitudinal direction and resolutions of 1024 pixels, 512 pixels, 256 pixels, 128 pixels, and 64 pixels in the lateral direction, as shown in FIG. 14.

As described above, the textures stored in the texture data 4A form a ripmap in which the textures have the same resolution in the longitudinal direction and have the resolution in the lateral direction reduced. When the image group G is formed of a plurality of images T arranged next to each other in the lateral direction, the respective images T have a substantially constant resolution in the longitudinal direction but have different lengths in the lateral direction in the dynamic part 50 and the static part 52. Thus, this embodiment is advantageous in that storing textures having a constant resolution in the longitudinal direction and different resolutions in the lateral direction into the texture data 4A and the texture memory 5A allows a smaller capacity of the texture data 4A and the texture memory 5A.

Fourth Embodiment

A display method according to a fourth embodiment will now be described.

Differences from the first embodiment will be mainly described and similar matters will not be described further. This embodiment is similar to the first embodiment except for using a different method for securing a free space in the texture memory 5A to store new textures, when the current free space in the texture memory 5A is insufficient.

In the display method according to this embodiment, when the control unit 3 stores a plurality of new textures having different resolutions into the texture memory 5A and generates and displays the image T with a new textures but when the texture memory 5A does not have a sufficient free space to store the new textures and the texture memory 5A does not have a sufficient free space even after deleting textures in the lexicographic order from a texture having an old history of use and a texture having a high resolution, the control unit 3 deletes textures from the texture memory 5A in order from a texture having a high resolution for each image T and stores the new textures into the free space secured in the texture memory 5A. Subsequently, the control unit draws and generates image T with a new texture having a resolution corresponding to the size of the image T displayed on the image display unit 2, and displays the image T on the image display unit 2.

When a sufficient free space cannot be secured in the texture memory 5A even by the above method, a free space is then secured by not storing some of the plurality of new textures having different resolutions into the texture memory 5A, in order from a new texture having a high resolution. That is, a new texture having a lower resolution corresponding to the size of the image T displayed on the image display unit 2 is stored into the texture memory 5A, and the image T is drawn and generated with this new texture and displayed on the image display unit 2.

As described above, the image T displayed on the image display unit 2 is generated with the texture having the resolution corresponding to the size of the image T displayed on the image display unit 2, selected from the texture memory 5A. Therefore, the resulting image is highly visible instead of being blurred or noticeably jaggy. When storing new textures into the texture memory 5A and generating and displaying the image T with a new texture, a space to store the new textures can be secured without increasing the capacity of the texture memory 5A, by deleting some of the textures stored in the texture memory 5A in order from a texture having a high resolution.

Also, a space to store the new textures can be secured without increasing the capacity of the texture memory 5A, by not storing some of the plurality of new textures having different resolutions, in order from a new texture having a high resolution.

Fifth Embodiment

A display method according to a fifth embodiment will now be described.

Differences from the first embodiment will be mainly described and similar matters will not be described further. This embodiment is similar to the first embodiment except for using a different method for securing a free space in the texture memory 5A to store new textures, when the current free space in the texture memory 5A is insufficient.

In the display method according to this embodiment, when the control unit 3 stores a plurality of new textures having different resolutions into the texture memory 5A and generates and displays the image T but when the texture memory 5A does not have a sufficient free space to store the new textures, the control unit 3 deletes the textures stored in the texture memory 5A, from the texture memory 5A, holding a deletion priority order that is different from the order from a texture having an old history of use and a texture having a high resolution, for each image T, and in a lexicographic order from the texture having the old history of use, the texture having the high resolution, and the deletion priority order, and stores the new textures into the free space secured in the texture memory 5A. Subsequently, the control unit draws and generates the image T with a new texture having a resolution corresponding to the image T displayed on the image display unit 2, and displays the image T on the image display unit 2.

As described above, the image T displayed on the image display unit 2 is generated with the texture having the resolution corresponding to the size of the image T displayed on the image display unit 2, selected from the texture memory 5A. Therefore, the resulting image is highly visible instead of being blurred or noticeably jaggy. When storing new textures into the texture memory 5A and generating and displaying the image T with a new texture, a space to store the new textures can be secured without increasing the capacity of the texture memory 5A, by deleting some of the textures in the lexicographic order from the texture having the old history of use, the texture having the high resolution, and the deletion priority order.

The contents derived from the embodiments will now be described.

A display method for displaying a plurality of images on a display unit includes: generating the image with a texture having a resolution corresponding to a size of the image displayed on the display unit, the texture being selected from a texture memory storing a plurality of textures having different resolutions for the same image; and when storing a plurality of new textures having different resolutions into the texture memory and generating and displaying the image with the new texture but when the texture memory does not have a sufficient free space to store the new textures, deleting the texture stored in the texture memory, from the texture memory, in a lexicographic order from the texture having an old history of use and the texture having a high resolution, and storing the new textures into the free space secured in the texture memory.

According to this display method, the image displayed on the display unit is generated with the texture having the resolution corresponding to the size of the image displayed on the display unit, selected from the texture memory. Therefore, the resulting image is highly visible instead of being blurred or noticeably jaggy. Also, when storing new textures into the texture memory and generating and displaying the image with a new texture, a space to store the new textures can be secured without increasing the capacity of the texture memory, by deleting textures from the texture memory in the lexicographic order from the texture having an old history of use and the texture having a high resolution.

In the display method, the texture stored in the texture memory may be selected from texture data in which the textures having different resolutions are stored.

According to this display method, a texture having a new resolution can be selected from the texture data storing textures having different resolutions and can be easily stored into the texture memory, according to need.

In the display method, the texture stored in the texture data may be a mipmap resulting from similarly reducing the resolution in a longitudinal direction and the resolution in a lateral direction of the texture.

According to this display method, the texture stored in the texture data is a mipmap. Therefore, textures having many resolutions resulting from similarly reducing the resolutions in the longitudinal direction and the lateral direction of the texture can be stored. Thus, a texture having a resolution corresponding to the size of the image displayed on the display unit can be easily selected and stored into the texture memory.

In the display method, the texture stored in the texture data may be a ripmap resulting from separately reducing the resolution in a longitudinal direction and the resolution in a lateral direction of the texture.

According to this display method, the texture stored in the texture data is a ripmap. Therefore, textures having a greater number of resolutions resulting from separately reducing the resolutions in the longitudinal direction and the lateral direction of the texture can be stored. Thus, a texture having a resolution corresponding to the size of the image displayed on the display unit can be easily selected and stored into the texture memory.

In the display method, the texture stored in the texture data may be a ripmap in which the texture has the same resolution in a longitudinal direction and has the resolution in a lateral direction reduced.

According to this display method, the texture stored in the texture data forms a ripmap in which the texture has the same resolution in the longitudinal direction and has the resolution in the lateral direction reduced. When the image group is formed of a plurality of images arranged next to each other in the lateral direction, the respective images have a substantially constant resolution in the longitudinal direction but have different lengths in the lateral direction in the dynamic part and the static part. Thus, this display method is advantageous in that storing textures having a constant resolution in the longitudinal direction and different resolutions in the lateral direction into the texture data and the texture memory allows a smaller capacity of the texture data and the texture memory.

A display device includes: a display unit displaying a plurality of images; and a control unit generating the image with a texture having a resolution corresponding to a size of the image displayed on the display unit, the texture being selected from a texture memory storing a plurality of textures having different resolutions for the same image, the control unit deleting the texture stored in the texture memory, from the texture memory, in a lexicographic order from the texture having an old history of use and the texture having a high resolution, when storing a plurality of new textures having different resolutions into the texture memory and generating and displaying the image with the new texture but when the texture memory does not have a sufficient free space to store the new textures, the control unit storing the new textures into the free space secured in the texture memory and displaying the generated image on the display unit.

According to this display device, the image displayed on the display unit is generated with the texture having the resolution corresponding to the size of the image displayed on the display unit, selected from the texture memory. Therefore, the resulting image is highly visible instead of being blurred or noticeably jaggy. Also, when storing new textures into the texture memory and generating and displaying the image with a new texture, a space to store the new textures can be secured without increasing the capacity of the texture memory, by deleting textures from the texture memory in the lexicographic order from the texture having an old history of use and the texture having a high resolution.

A non-transitory computer-readable storage medium stores a display program for displaying a plurality of images on a display unit. The display program causes a computer to function as: a selection unit selecting a texture having a resolution corresponding to a size of the image displayed on the display unit, from a texture memory storing a plurality of textures having different resolutions for the same image; a texture storage unit deleting the texture stored in the texture memory, from the texture memory, in a lexicographic order from the texture having an old history of use and the texture having a high resolution, when storing a plurality of new textures having different resolutions into the texture memory and generating and displaying the image with the new texture but when the texture memory does not have a sufficient free space to store the new textures, the texture storage unit storing the new textures into the free space secured in the texture memory; an image generation unit generating the image with the texture selected from the texture memory; and an image display unit displaying the generated image on the display unit.

According to this display program, the image displayed on the display unit is generated with the texture having the resolution corresponding to the size of the image displayed on the display unit, selected from the texture memory. Therefore, the resulting image is highly visible instead of being blurred or noticeably jaggy. Also, when storing new textures into the texture memory and generating and displaying the image with a new texture, a space to store the new textures can be secured without increasing the capacity of the texture memory, by deleting textures from the texture memory in the lexicographic order from the texture having an old history of use and the texture having a high resolution.

A display method for displaying a plurality of images on a display unit includes: generating the image with a texture having a resolution corresponding to a size of the image displayed on the display unit, the texture being selected from a texture memory storing a plurality of textures having different resolutions for the same image; and when storing a plurality of new textures having different resolutions into the texture memory and generating and displaying the image but when the texture memory does not have a sufficient free space and the free space is not sufficient even after the texture is deleted in a lexicographic order from the texture having an old history of use and the texture having a high resolution, deleting the texture from the texture memory in order from the texture having a high resolution for each of the images, and storing the new textures into the free space secured in the texture memory.

According to this display method, the image displayed on the display unit is generated with the texture having the resolution corresponding to the size of the image displayed on the display unit, selected from the texture memory. Therefore, the resulting image is highly visible instead of being blurred or noticeably jaggy. Also, when storing new textures into the texture memory and generating and displaying the image with a new texture, a space to store the new textures can be secured without increasing the capacity of the texture memory, by deleting textures in order from the texture having a high resolution, of the textures stored in the texture memory.

In the display method, the free space may be secured by not storing the new texture, of the plurality of new textures having the different resolutions, in order from the new texture having a high resolution.

According to this display method, when storing new textures into the texture memory and generating and displaying the image with a new texture, a space to store the new textures can be secured without increasing the capacity of the texture memory, by not storing new textures of the plurality of new textures having different resolutions into the texture memory, in order from the new texture having a high resolution.

A display method for displaying a plurality of images on a display unit includes: generating the image with a texture having a resolution corresponding to a size of the image displayed on the display unit, the texture being selected from a texture memory storing a plurality of textures having different resolutions for the same image; and when storing a plurality of new textures having different resolutions into the texture memory and generating and displaying the image but when the texture memory does not have a sufficient free space to store the new textures, holding a deletion priority order that is different from an order from the texture having an old history of use and the texture having a high resolution, for each of the images, then deleting the texture stored in the texture memory, from the texture memory, in a lexicographic order from the texture having the old history of use, the texture having the high resolution, and the deletion priority order, and storing the new textures into the free space secured in the texture memory.

According to this display method, the image displayed on the display unit is generated with the texture having the resolution corresponding to the size of the image displayed on the display unit, selected from the texture memory. Therefore, the resulting image is highly visible instead of being blurred or noticeably jaggy. Also, when storing new textures into the texture memory and generating and displaying the image with a new texture, a space to store the new textures can be secured without increasing the capacity of the texture memory, by deleting textures from the texture memory in the lexicographic order from the texture having an old history of use, the texture having a high resolution, and the deletion priority order.

What is claimed is:

1. A display method for displaying a plurality of images on a display, the method comprising:
   generating one of the plurality of images with a texture having a resolution corresponding to a size of the one image to be displayed on the display, the texture being selected from a texture memory storing a plurality of stored textures having different resolutions for the one image; and when storing a plurality of new textures having different resolutions for the one image into the texture memory and generating and displaying the one image with one of the new textures, but the texture memory does not have sufficient free space to store the new textures, deleting at least one of the stored textures from the texture memory, in a lexicographic order from an oldest history of use texture to a highest resolution texture, to secure free space in the texture memory, and storing the new textures into the free space secured in the texture memory.

2. The display method according to claim 1, wherein
the stored textures are selected from texture data including different resolution textures.

3. The display method according to claim 2, wherein
the texture data is a mipmap resulting from similarly reducing a longitudinal direction resolution and a lateral direction resolution of the texture.

4. The display method according to claim 2, wherein
the texture data is a mipmap resulting from separately reducing a longitudinal direction resolution and a lateral direction resolution of the texture.

5. The display method according to claim 2, wherein
the texture data is a mipmap in which the texture has an unchanged longitudinal direction resolution and a reduced lateral direction resolution.

6. A display device comprising:
a display displaying a plurality of images; and
a controller generating one of the plurality of images with a texture having a resolution corresponding to a size of the one image to be displayed on the display, the texture being selected from a texture memory storing a plurality of stored textures having different resolutions for the one image, the controller deleting at least one of the stored textures from the texture memory, in a lexicographic order from an oldest history of use texture to a highest resolution texture, to secure free space in the texture memory when storing a plurality of new textures having different resolutions for the one image into the texture memory and generating and displaying the one image with one of the new textures, but the but when the texture memory does not have sufficient free space to store the new textures, the controller storing the new textures into the free space secured in the texture memory and displaying the one image on the display.

7. A non-transitory computer-readable storage medium storing a display program for displaying a plurality of images on a display, the display program causing a computer to function as:

a selection unit selecting a texture having a resolution corresponding to a size of one of the plurality of images to be displayed on the display, from a texture memory storing a plurality of stored textures having different resolutions for the one image;

a texture storage deleting at least one of the stored textures from the texture memory, in a lexicographic order from an oldest history of use texture to a highest resolution texture, to secure free space in the texture memory when storing a plurality of new textures having different resolutions for the one image into the texture memory and generating and displaying the one image with one of the new textures but but when the texture memory does not have sufficient free space to store the new textures, the texture storage storing the new textures into the free space secured in the texture memory;

an image generator generating the one image with the texture selected from the texture memory; and an image display displaying the one image on the display.

8. A display method for displaying a plurality of images on a display, the method comprising:

generating one of the plurality of images with a texture having a resolution corresponding to a size of the one image to be displayed on the display, the texture being selected from a texture memory storing a plurality of stored textures having different resolutions for the one image; and when storing a plurality of new textures having different resolutions for the one image into the texture memory and generating and displaying the one image, but the texture memory does not have sufficient free space to store the new textures, deleting at least one of the stored textures from the texture memory, in a lexicographic order from an oldest history of use texture to a highest resolution texture, to secure free space in the texture memory and the free space is not sufficient even after the at least one of the stored textures is deleted, deleting at least another one of the stored textures from the texture memory in order from a highest resolution for each of the stored images, to secure more of the free space in the texture memory, and storing the new textures into the free space secured in the texture memory.

9. The display method according to claim 8, wherein
one or more of the plurality of new textures having the different resolutions are selectively not stored during the storing, in order from a highest resolution new texture, based on the free space secured in the texture memory.

10. A display method for displaying a plurality of images on a display, the method comprising:

generating one of the plurality of images with a texture having a resolution corresponding to a size of the one image to be displayed on the display, the texture being selected from a texture memory storing a plurality of stored textures having different resolutions for the one image; and when storing a plurality of new textures having different resolutions for the one image into the texture memory and generating and displaying the one image, but the texture memory does not have sufficient free space to store the new textures, holding a deletion priority order that is different from an order that is from an oldest history of use texture to a highest resolution texture, for the one image, deleting at least one of the stored textures from the texture memory, in a lexicographic order from the oldest history of use texture, the highest resolution texture, and the deletion priority order, and storing the new textures into the free space secured in the texture memory.

* * * * *